United States Patent
Yoshimura et al.

[11] Patent Number: 5,827,472
[45] Date of Patent: Oct. 27, 1998

[54] PROCESS FOR THE PRODUCTION OF SILICON NITRIDE SINTERED BODY

[75] Inventors: Masashi Yoshimura; Takeshi Satoh; Akira Yamaguchi; Akira Yamakawa, all of Itami, Japan

[73] Assignee: Sumitomo Electric Industries, Ltd., Japan

[21] Appl. No.: 536,446

[22] Filed: Sep. 29, 1995

[30] Foreign Application Priority Data

Oct. 19, 1994 [JP] Japan .................................. 6-253330

[51] Int. Cl.⁶ .................................................. C04B 35/584
[52] U.S. Cl. ........................... 264/665; 264/676; 264/683
[58] Field of Search ................................ 264/65, 66, 665, 264/676, 683

[56] References Cited

U.S. PATENT DOCUMENTS

| | | | |
|---|---|---|---|
| 4,376,742 | 3/1983 | Mah | 264/65 |
| 4,506,021 | 3/1985 | Jack et al. | 264/665 |
| 4,702,869 | 10/1987 | Higuchi et al. | 264/65 |
| 4,834,926 | 5/1989 | Iwasaki et al. | 264/65 |
| 4,886,556 | 12/1989 | Suzuki et al. | 264/65 |

FOREIGN PATENT DOCUMENTS

| | | |
|---|---|---|
| 0111922 | 6/1984 | European Pat. Off. . |
| 0587906 | 3/1994 | European Pat. Off. . |
| 60-81076 | 5/1985 | Japan . |
| 64-52679 | 2/1989 | Japan . |
| 164773 | 6/1990 | Japan . |
| 3-80755 | 12/1991 | Japan . |
| 4-367579 | 12/1992 | Japan . |
| 149112 | 6/1993 | Japan . |
| 194060 | 8/1993 | Japan . |

OTHER PUBLICATIONS

Abstract of JP 6015290 Aug. 1985.
Yogyo Kyokaishi, vol. 95,No. 12, 1987 JP pp. 1219–1222, XP000578971 S, Sakaguchi et al, Internal . . . temps. Abstract.
Chem.Abstracts,vol. 110, No. 22, May 29, 1989 Ohio, Abst.No. 198045 Y. Yammoto et al, Manufacture . . . Ceramic Parts,XP0057756 & JP–A–63 285 182,Nov. 22, 1988.
Chem.Abs.vol. 109,No. 6,Aug. 8, 1988 Abst.No. 42547, Manufacture . . . Articles.
JP–A–63 055 180 Toshiba Corp. Mar. 9, 1988 Database WPI Week 8525 Derwent Publ.Ltr. GB, AN 85–149087.
XP002010834 & JP–A–60 081 076 Hitachi K.K., May 9, 1985 Abstract.

*Primary Examiner*—James Derrington
*Attorney, Agent, or Firm*—Bierman, Muserlian and Lucas

[57] ABSTRACT

A process for the production of a silicon nitride sintered body which comprises heat-treating a stock of silicon nitride sintered body within a temperature range of from the temperature at which the internal friction of the stock exhibits a peculiar peak maximum minus 150° C. to that plus 150° C. A representative used in the process is one which is produced by mixing powdered silicon nitride with powdery sintering aids so as to give a powder mixture comprising 5 to 15% by weight (in terms of oxide) of at least one element selected from the group consisting of rare earth elements and aluminum, 0.5 to 5% by weight (in terms of oxide) of at least one element selected from the group consisting of Mg, Ti and Ca and the balance of $Si_3N_4$, molding the powder mixture, and sintering the resulting compact in a nitrogen-containing atmosphere at 1500° to 1700° C.

2 Claims, 4 Drawing Sheets

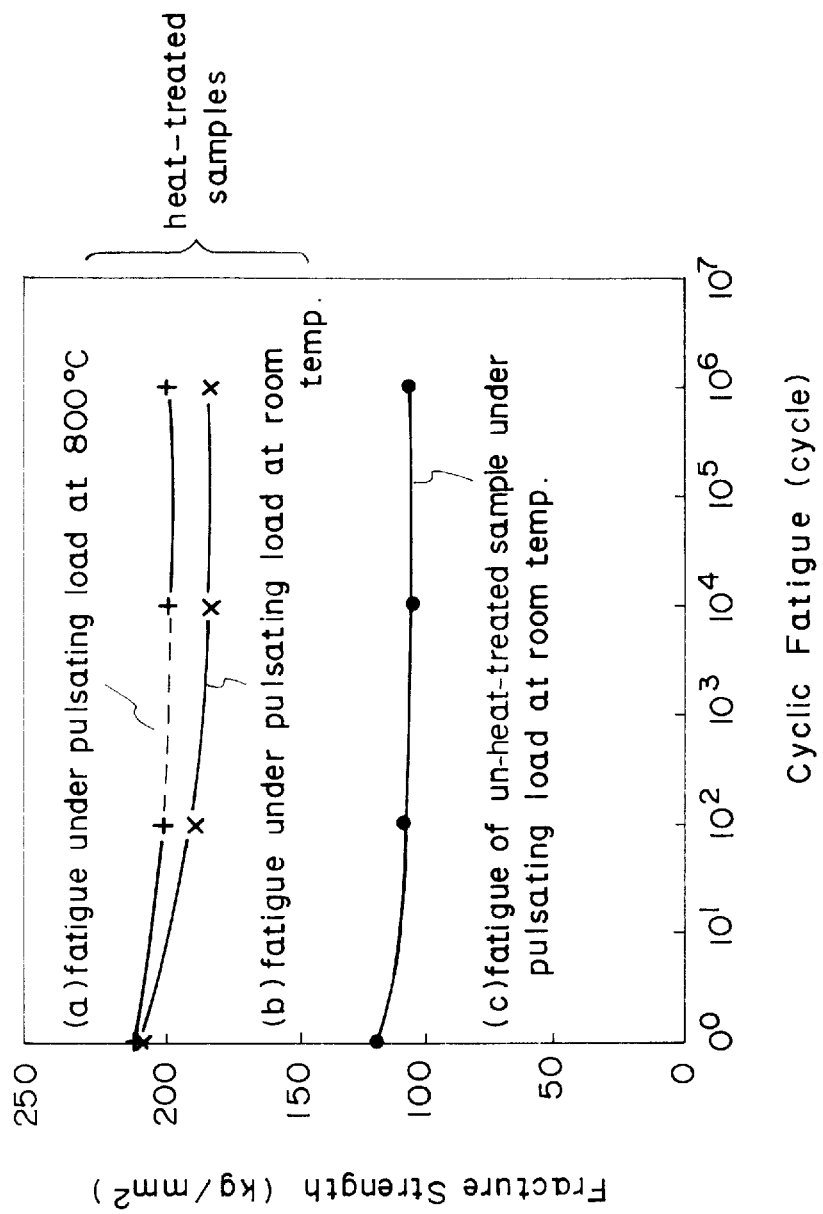

PROCESS FOR THE PRODUCTION OF SILICON NITRIDE SINTERED BODY

BACKGROUND OF THE INVENTION

1. Field of the Invention

The present invention relates to a process for the production of a silicon nitride sintered body, by which a silicon nitride structural part having high strength and high reliability can be provided.

2. Description of the Prior Art

Silicon nitride ceramics attract attention as mechanical parts used under extremely severe conditions owing to the lightness, high abrasion resistance, high strength and excellent high-temperature strength thereof. However, the demand on the quality and price of silicon nitride ceramics has become severer from year to year, so that many studies have been made on silicon nitride materials.

Meanwhile, the article to be used as a mechanical part or the like must have high accuracy in dimensions and surface finish, so that it is a general practice in the art to produce it by grinding a stock with a diamond grind wheel or the like into an objective shape.

However, ceramics are generally brittle and the strength thereof is remarkably lowered by the surface defect caused by grinding processing or the like, which is the most serious hindrance in putting ceramics to practical use.

For example, it has been reported by Imai et al. (TOYOTA MACHINE WORKS, LTD. Technical Report, Vol. 26, No. 3.4, page 25, line 23, left column—page 26, line 24, left column) that when a ceramic is subjected to grinding processing, cracks parallel to the direction of grinding are formed on the processed surface of the ceramic to lower the strength inherent in the ceramic remarkably. Therefore, the grinding processing of a part made of a new ceramic must be conducted by the use of finer diamond abrasive grains to prevent the surface from being damaged, but the use of such finer abrasive grains lowers the grinding efficiency, being disadvantageous in productivity and cost. Under these circumstances, various improvements have been made to solve the above problem.

For example, there have been made many attempts to restore the cracks formed on the surface of a part made of a ceramic during grinding processing by heat-treating the part at various temperatures in various atmospheres. Several examples of the attempts will now be described.

Japanese Patent Laid-Open No. 81076/1985 (the 3rd line in the upper left column of the 2nd page to the 11th line in the upper right column of the same page) discloses a process which comprises keeping a silicon nitride ceramic in the atmospheric air at 950° to 1400° C. for at least 30 minutes and in which the silicon contained in the ceramic $Si_3N_4$ is reacted with atmospheric oxygen to form an oxide on the surface of the ceramic, and this oxide restores the surface defects (such as a crack) of the ceramic to enhance the bending strength thereof.

Japanese Patent Laid-Open No. 52679/1989 (the 9th to 14th lines in the upper right column of the 2nd page) discloses that the strength of sialon can be improved by heat treatment at 900° to 950° C. in the atmospheric air and that the sialon thus treated is superior to the un-heat-treated defect-free sialon in strength. Further, it is also described in this document that the reason why this phenomenon occurs is that the surface of sialon is covered by a modified phase formed by the surface oxidation thereof and the diffusion of aluminum contained in grain boundary phases to restore the defect causative of lowering the strength, e.g., fine flaw caused by grinding.

Japanese Patent Publication No. 80755/1991 (the 17th line in the right column of the 1st page to the 22nd line in the right column of the 2nd page) discloses that when a sintered silicon nitride ceramic prepared by using yttrium oxide, aluminum oxide and aluminum nitride as sintering aids is subjected to grinding process and thereafter heat-treated in the atmospheric air at a temperature which is lower than the sintering temperature but higher than the softening temperature of the glass phase, i.e., at 800° to 1100° C. for 1 to 24 hours, the acute-angled microcutouts formed on the surface of the ceramic during the grinding processing are dulled and a silicon dioxide layer is formed on the surface of the ceramic, and by the interaction between these phenomena, the mechanical strength of the ceramic can be improved.

Japanese Patent Publication No. 50276/1992 (the 3rd to 41st lines in the left column of the 2nd page) disclose that a vitreous layer composed of $SiO_2$, $Al_2O_3$ and $Y_2O_3$ is formed on the surface of sialon body when the sialon sintered body is heated in an oxygen-containing atmosphere at a temperature of 875° to 950° C. for at least 30 minutes and this vitreous layer restores the surface defect of the sintered body to improve the corrosion resistance and strength thereof.

Japanese Patent Laid-Open No. 367579/1992 (paragraphs 0008 to 0012) discloses a process of enhancing the resistance to loss and abrasion of a silicon nitride sintered body by forming an oxide layer having a thickness of 10000 Å or below on the surface of the sintered body to thereby restore the defects remaining on the surface. Specifically, the sintered body, which contains at least one member selected from the group consisting of $\alpha$-$Si_3N_4$, $\beta$-$Si_3N_4$, $\alpha'$-sialon and $\beta$-sialon, is heated to 800° to 1100° C. in an oxidizing atmosphere, by which a layer of an oxide (such as oxide, oxynitride, oxycarbide or oxycarbonitride) is formed on the surface to improve the strength of the sintered body.

These processes aim at enhancing the reliability of strength of the ceramic only by the healing function of an oxide film formed by heating the ceramic at a predetermined temperature in a specific atmosphere for a predetermined time, so that it cannot be said that they are industrially reliable means for recovering the strength.

SUMMARY OF THE INVENTION

In order to solve the above problem, the present invention aims at providing a process for the production of a silicon nitride material, by which a silicon nitride material remarkably improved in strength, reliability and fatigue characteristics can be provided.

The inventors of the present invention have made intensive studies on the production of a silicon nitride sintered body to find the following.

Namely, the present invention relates to a process for the production of a silicon nitride sintered body, characterized by heat-treating a silicon nitride sintered body stock within a temperature range of the temperature (Tp) at which the internal friction of the stock exhibits a peculiar peak maximum minus 150° C. to that plus 150° C., i.e., within a temperature range of Tp±150° C. The present invention also includes a process as described above wherein the heat treatment is conducted by keeping the stock in the above temperature range for 5 to 600 minutes and one as described above wherein the heat treatment is conducted in a non-reducing gas atmosphere. A representative example of the above process wherein the composition of the stock to be subjected to the heat treatment and the production of the stock are specified is a process which comprises (1) mixing powdered silicon nitride with powdery sintering aids so as to give a powder mixture,
(2) molding the powder mixture,
(3) sintering the resulting compact in a nitrogen-containing atmosphere to give a sintered body,
(4) processing the sintered body into predetermined sizes to give a silicon nitride sintered body stock, and
(5) heat-treating the silicon nitride sintered body stock within a temperature range of the temperature at a peculiar peak maximum due to the internal friction of the stock ±150° C.

The heat treatment of the step (5) is conducted by keeping the sintered body stock at a predetermined temperature according to the present invention for 5 to 600 minutes in a non-reducing gas atmosphere.

The present invention provides a production process for imparting excellent strength, fatigue resistance and reliability of sliding characteristics to materials for parts of an automotive engine or other materials to be used at moderate and high temperatures (near 1000° C.).

BRIEF DESCRIPTION OF THE DRAWINGS

FIG. 6 is a graph showing the fatigue characteristics of the test samples of the present invention under pulsating load.

DETAILED DESCRIPTION OF THE PREFERRED EMBODIMENTS

The process for the production of a silicon nitride sintered body according to the present invention is characterized in that a structural part made of the sintered body of the above composition produced through sintering and processing into a predetermined shape is heat-treated within a temperature range of the temperature at which the internal friction of the structural part reaches a peculiar peak maximum minus 150° C. to that plus 150° C. to thereby improve the strength characteristics thereof. This heat treatment is effective in restoring the surface defects, enabling the production of the stable high-strength sintered body.

The term "internal friction" refers to the phenomenon that the deformation energy applied to a material from its inside is damped by the change of part of the deformation energy into thermal kinetic energy, serving as an indication of the damping characteristics of the material. When a periodic external force such as vibration is applied, the internal friction is defined as the ratio of the energy lost during one cycle to the whole elastic energy, which also corresponds to the energy absorption factor of a material exhibited when a vibration energy is applied to the material. Accordingly, a material having a higher internal friction exhibits a higher energy absorption factor.

In the present invention, each internal friction is determined by the resonance method described in Journal of Material Science Letters No. 3, pp. 345–348 (1984).

Figure 1:
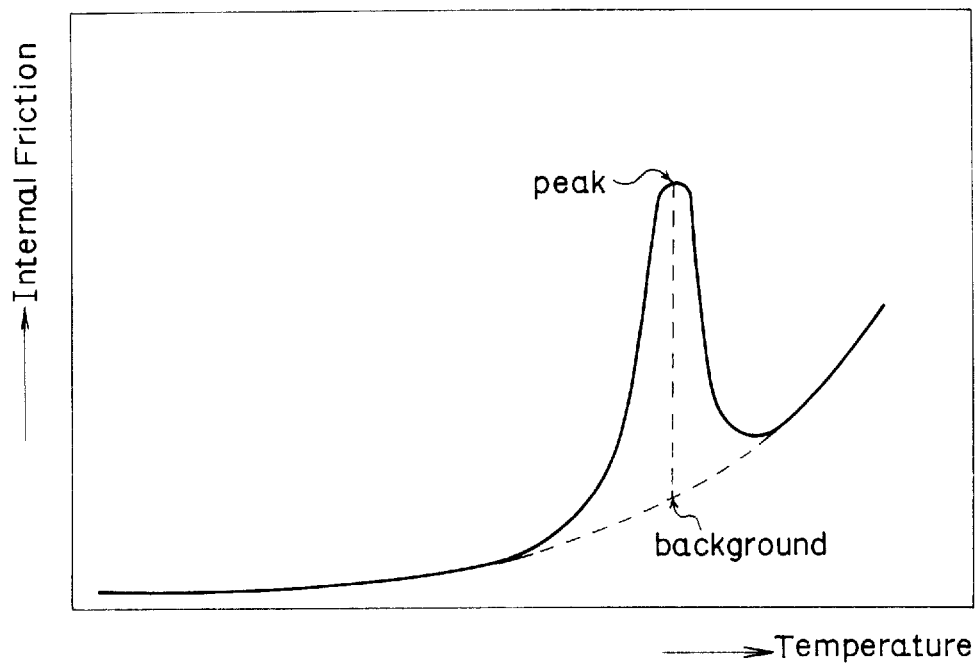
FIG. 1 is a graph illustrating the internal friction according to the present invention.

As understood from the graph in FIG. 1 showing the temperature dependence of internal friction, the internal friction increases as the deformability of the bulk itself is enhanced with increasing temperature. The internal friction peak in FIG. 1 corresponds to a peculiarly exhibited sudden increase in the internal friction. It is generally believed that such a peak in the internal friction is due to the portion which is softened by temperature increase, i.e., grain boundary phase.

When the above heat treatment is conducted at a temperature exceeding the temperature (Tp) at which the internal friction reaches a peculiar peak maximum plus 150° C., i.e., at a temperature exceeding (Tp+150° C.), the crystallization of grain boundary phase will advance to lower the strength characteristics inherent in the material, i.e., the strength will not be improved. Further, when the above heat treatment is conducted at a temperature lower than the temperature (Tp) at which the internal friction reaches a peculiar peak maximum minus 150° C., i.e., at a temperature lower than (Tp−150° C.), the strength will not be also improved. The reason therefor is believed to be that the grain boundary phase part does not reach its softening temperature, though the reason is not apparent. Further, it is preferable that the heat treatment temperature be in the range of the peak temperature (Tp)±100° C. When the heat treatment is conducted in such a temperature range, a sintering aid is effectively diffused over the portions suffering from defects such as a crack and the surface oxidation or healing of the material are effectively advanced, so that the tips of cracks are particularly effectively restored to improve the strength of the material. These phenomena are believed to be due to a greater change in the grain boundary phase of the material.

The heat treatment time may be suitably selected depending upon the composition of the stock. Generally, it is preferable that the heat treatment time range from 5 to 600 minutes. The heat treatment for less than 5 minutes will give no satisfactory improvement in the strength, while that for a time exceeding 600 minutes will unfavorably lower the productivity and the strength.

The silicon nitride sintered body produced by the above process exhibits a remarkably enhanced strength. In a nitrogen atmosphere, particularly, the material having a strength of about 100 kg/mm$^2$ is converted into one having a strength of 200 kg/mm$^2$ or above, i.e., the strength is enhanced about twice or more times. There has been found no case wherein the strength of sintered silicon nitride is recovered to such a high level as described above.

Although the atmosphere for the heat treatment according to the present invention may be any one except hydrogen-containing atmospheres, it is preferable that the heat treatment be conducted in an inert gas such as nitrogen, argon or a mixture of them or in a vacuum. The reason therefor is as follows: when the heat treatment is conducted in an oxidizing atmosphere, the surface roughness of the material will change owing to surface oxidation; and when it is conducted in a hydrogen atmosphere, the surface layer of the material will become brittle; but when it is conducted in any other atmosphere, however, the strength can be enhanced without any change in the surface roughness and any deterioration of the surface layer to give a silicon nitride sintered body which can be advantageously used as precision parts of machines.

A representative example of the composition of the stock of a silicon nitride sintered body to be subjected to the heat treatment is one comprising 5 to 15% by weight (in terms of oxide) of at least one element selected from the group consisting of rare earth elements and aluminum, 0.5 to 5% by weight (in terms of oxide) of at least one element selected from the group consisting of Mg, Ti and Ca and the balance of $Si_3N_4$.

In the case of such a stock, the production process preferably comprises mixing powdery materials to a powder mixture having the above-mentioned composition, molding the powder mixture into a compact, sintering the resulting compact in a nitrogen-containing atmosphere at 1500° to 1700° C. to give a sintered body having a relative density of 97% or above, processing the sintered body into predetermined sizes to give a work stock, and heat-treating the stock at a temperature ranging from the temperature at which the internal friction of the stock reaches a peculiar peak maximum minus 150° C. to that plus 150° C.

The above mixing may be conducted by, e.g., adding at least one powdery material selected from the group consisting of $Al_2O_3$ and oxides of rare earth elements and at least one powdery material selected from the group consisting of MgO, $TiO_2$ and CaO in predetermined amounts to powdered silicon nitride. It is preferable that the rare earth element be yttrium. If necessary, a double oxide such as $MgAl_2O_4$ or $MgTiO_3$ may be used. The forming may be conducted by pressing, injection molding, casting or the like, though the process of the forming is not particularly limited.

With respect to the sintering temperature, when the sintering is conducted at a temperature exceeding 1700° C., the aid components will be evaporated and the particles of the material will become too large, so that the necessary strength cannot be obtained and a scattering in strength is caused. On the contrary, when the sintering is conducted at a temperature lower than 1500° C., the desired relative density and satisfactory strength will not be obtained.

The sintered body thus produced is characterized by having a linear density of crystal particles of 120 to 250 per length of 50 μm in an arbitrary two-dimensional section thereof, a maximum diameter at maximum area ratio of 1 to 2 μm and a minimum diameter at maximum area ratio of 0.1 to 0.5 μm.

By virtue of these characteristics, the sintered body exhibits an improved strength with a minimized scattering in strength and the aforestated strengthening effect by the heat treatment is enhanced.

The term "linear density" refers to the number of particles cut by a line segment having a length of 50 μm in an arbitrary two-dimensional section of the sintered body. For example, a linear density of 120 means the presence of 120 particles within a line segment of 50 μm.

The maximum diameter at maximum area ratio and the minimum diameter at maximum area ratio are defined as follows.

Figure 2:
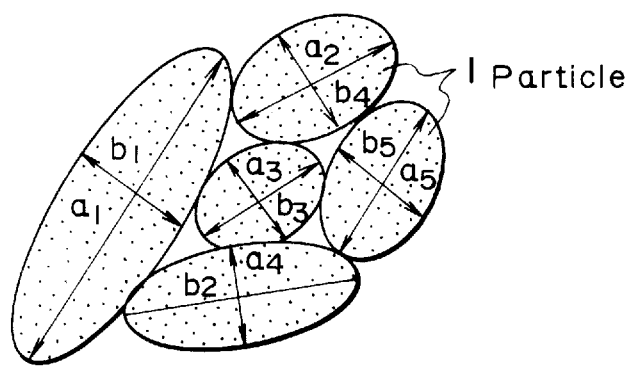
FIG. 2 is an illustration explaining the minimum and maximum axes used in the present invention as evaluation items.

The term "maximum diameter" refers to the longest diameter of crystal particles observed in a two-dimensional section of a sintered body as shown in FIG. 2 by $a_1$ to $a_5$, while the term "minimum diameter" refers to the shortest diameter thereof as shown by $b_1$ to $b_5$. Further, the area of each particle in the two-dimensional section is defined as "particle area" and the sum of areas of all particles observed in a field of vision is defined as "whole particle area".

The particle area A of each particle observed is calculated by regarding the section of the particle as an ellipse wherein the maximum and minimum diameters a and b are regarded as the major and minor axes respectively. Further, the sum of all particle areas thus determined, i.e., the whole particle area is calculated and represented by ΣA.

When the area ratio of a group of particles having the same maximum diameter is defined as the ratio of the sum of the particle areas of a group of particles having the same maximum diameter (ΣA) to the whole particle area (ΣA) and the area ratio of a group of particles having the same minimum diameter is defined as the ratio of the sum of the particle areas of a group of particles having the same minimum diameter (ΣAa) to the whole particle area (ΣB), the maximum diameter at maximum area ratio is defined as the maximum diameter at which the area ratio ΣA/ΣA reaches the maximum, while the minimum diameter at maximum area ratio is defined as the minimum diameter at which the area ratio ΣAa/ΣA reaches the maximum.

Figure 3:
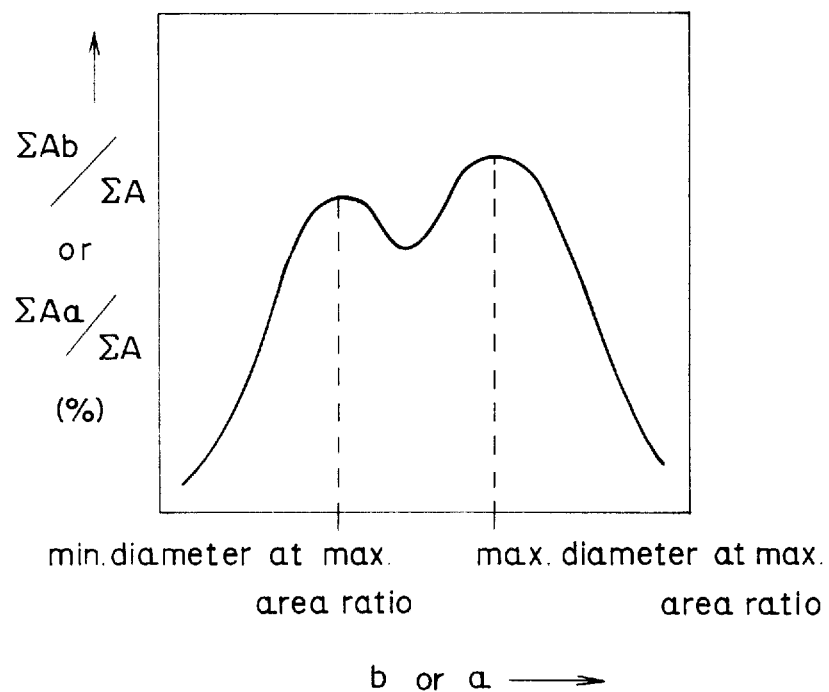
FIG. 3 is a graph showing the particle diameter distribution.

These values were determined by determining the b, a and A values of each particle, calculating ΣAb and ΣAa and forming a distribution curve as shown in FIG. 3 and reading the peak values.

In the present invention, other additives than the foregoing sintering aids may be used, so long as they meet the required fine structure and mechanical properties.

The process of the present invention can effectively give a silicon nitride sintered body having high strength and high reliability which has not been found as yet.

Examples of the present invention will now be described.

Example 1 (To the Sintering Step)

Powdered silicon nitride having a mean particle diameter of 0.5 μm, a degree of α-crystallinity of 96% and an oxygen content (as determined by the BET method) of 1.4% by weight and aids listed in Table 1 were used as the starting powdery silicon nitride-based materials of the present invention. They were weighed according to Table 2, wet mixed together by the use of a nylon ball mill in ethanol for 72 hours, and dried to give a powder mixture.

TABLE 1

| Aid | Mean particle diameter (μm) |
| --- | --- |
| $Y_2O_3$ | 0.8 |
| $Al_2O_3$ | 0.4 |
| $TiO_2$ | 0.03 |
| CaO | 0.5 |
| MgO | 0.2 |

TABLE 2

| No. | $Si_3N_4$ | $Y_2O_3$ | $Al_2O_3$ | MgO | $TiO_2$ | CaO |
| --- | --- | --- | --- | --- | --- | --- |
| 1 | 91 | 5 | 3 | 1 | — | — |
| 2 | 90 | 5 | 1 | 1 | 1 | — |
| 3 | 90 | 5 | 3 | 1 | — | 1 |
| 4 | 88 | 7 | 3 | 1 | 1 | — |
| 5 | 90 | 5 | 4.5 | 0.5 | — | — |
| 6 | 88 | 5 | 3 | 2 | 2 | 1 |

(*1 all of the figures given in Table 1 are percentages by weight in terms of oxide)

The powder mixtures prepared above were each pressed into compacts and subjected to primary sintering at 1500° C. in a nitrogen atmosphere at 1 atm for 4 hours and secondary sintering at 1650° C. in a nitrogen atmosphere at 10 atm for one hour, with the heating rate being 400° C./hr in both sintering steps.

Table 3 shows the densities of the sintered bodies prepared above and the temperatures at which the internal frictions of the sintered bodies reach their respective peculiar peak maximums.

Further, each sintered body was heat-treated at its peak temperature of internal friction for 120 minutes in the air and subjected to the three-point flexural strength test in accordance with JIS R1601 to compare with the three-point flexural strength values measured before the heat treatment. The test results are shown in Table 3.

TABLE 3

| No. | Peak temp. of internal friction (°C.) | Average flexural strength (kg/mm²) | |
|---|---|---|---|
| | | after heat treatment | before heat treatment |
| 1 | 1000 | 196 | 124 |
| 2 | 900 | 193 | 126 |
| 3 | 1050 | 185 | 119 |
| 4 | 1000 | 172 | 115 |
| 5 | 1100 | 165 | 109 |
| 6 | 950 | 160 | 108 |

It can be understood from the above results that a high flexural strength not less than 150 kg/mm² can be readily obtained by heat treating in the vicinity of the peak temperature of internal friction.

Example 2 (To the Processing Step)

The sample No. 2 specified in Table 2 of Example 1 was pressed and subjected to primary sintering at 1500° C. and secondary sintering in a manner as specified in Table 4, both sintering processes being conducted in a nitrogen atmosphere at 1000 atm for one hour at a temperature decrease rate of 400° C./hr. The resulting materials were processed according to JIS R1601 and subjected to the three-point flexural strength test. The results are given in Table 4. Part of each test piece was finished into an Ra (center-line mean roughness) of 0.02 μm and the resulting test piece was heated in a mixture comprising 50% HCl and 25% aqueous H₂O₂ at 60° C. for 15 minutes, sufficiently washed and irradiated with argon neutrons by the use of FAB (Fast-Atom Bombardment) equipment mfd. by ION TECH under the conditions of 4 to 5 KV and 2 mA (tilt angle: 60° C.) for 10 minutes to conduct etching. The resulting tissue was observed under a scanning electron microscope (15,000 × magnification) over an area of 10 μm×15 μm to determine the lengths of the major and minor axes. Further, the tissue was also observed at 5000 ×magnification to determine the linear density.

TABLE 4

| Sintering temp. (°C.) | Relative density (%) | Strength (kg/mm²) | Linear density (no. of particles per 50 μm) | Min. diameter (minor axis) at max. area ratio (μm) | Max. diameter (major axis) at max. area ratio (μm) |
|---|---|---|---|---|---|
| 1450 | 96.5 | 95 | 310 | 0.1 | 0.2 |
| 1500 | 97.5 | 152 | 250 | 0.1 | 0.4 |
| 1600 | 99.2 | 205 | 230 | 0.2 | 1.5 |
| 1700 | 99.5 | 162 | 160 | 0.3 | 2.0 |
| 1750 | 99.5 | 110 | 100 | 0.4 | 3.5 |
| 1800 | 99.3 | 96 | 86 | 0.8 | 5.0 |

It can be understood from the above results that when the sintering is conducted at 1500° to 1700° C., there can be easily obtained sintered bodies having a linear density of 150 to 250, a maximum diameter at maximum area ratio of 1 to 2 μm, a minimum diameter at maximum area ratio of 0.1 to 0.5 μm and a flexural strength of 150 kg/mm² or above.

Example 3 (To the Heat Treatment Step)

Figure 4:
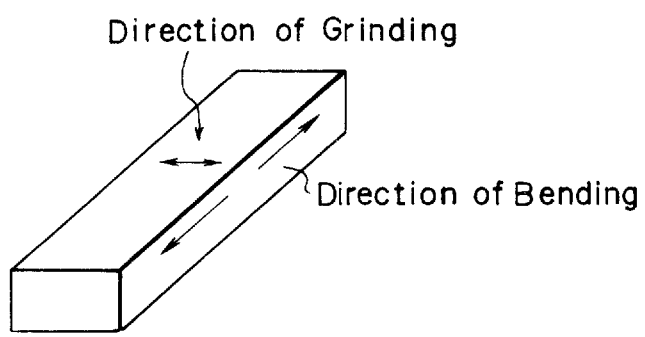
FIG. 4 is an illustration of the sintered body stock according to the present invention.

Samples were prepared from the material of No. 2 specified in Table 2 of Example 1 by sintering in the same manner as in No. 2 of Example 1. Some of the sintered bodies were lapped into an Ra of 0.02 μm or below to give lapped samples, while the other sintered bodies were subjected to single pass grinding with a #600 grindstone in a direction as shown in FIG. 4 to give single pass ground samples. These samples exhibited a peculiar peak maximum of internal friction at 900° C. Fifteen lapped samples and fifteen ground samples were kept at each temperature specified in the leftmost column of Table 5 in a nitrogen atmosphere for 4 hours to conduct heat treatment. The resulting samples were examined for average flexural strength and Weibull modulus of the strength.

TABLE 5

| Heat treatment temp. (°C.) | Single pass ground material | | Lapped material | |
|---|---|---|---|---|
| | av. flexural strength (kg/mm²) | Weibull modulus | av. flexural strength (kg/mm²) | Weibull modulus |
| 1200* | 110 | 14 | 130 | 16 |
| 1100* | 140 | 20 | 180 | 18 |
| 1050 | 182 | 23 | 210 | 23 |
| 950 | 208 | 25 | 228 | 29 |
| 850 | 185 | 19 | 215 | 25 |
| 750 | 145 | 17 | 200 | 17 |
| 650* | 105 | 16 | 193 | 15 |
| not treated | 102 | 16 | 198 | 15 |

*Comparative Example

It can be understood from the above results that the strength of a silicon nitride sintered body can be improved by heat treatment within a temperature range of the temperature (Tp) of peak internal friction minus 150° C. to that plus 150° C., i.e., within a temperature range of Tp±150° C. Further, it can also be understood that the strength and reliability thereof can be improved more effectively by heat treatment within a temperature range of the temperature (Tp) of peak internal friction minus 100° C. to that plus 100° C., i.e., within a temperature range of Tp±100° C.

Example 4

The same materials as those used in Example 3 were processed under various conditions and the resulting samples were examined for strength. Further, the center-line mean roughness (Ra) and maximum height (Rmax) of each sample were determined by the use of a surface roughness meter and the results are given in Table 6.

TABLE 6

| Surface roughness Ra (μm) | Max. height $R_{max}$ (μm) | Strength before treatment (kg/mm²) | Strength after treatment (kg/mm²) |
|---|---|---|---|
| 0.5 | 5.0 | 102 | 200 |
| 0.4 | 3.2 | 120 | 208 |
| 0.2 | 1.6 | 180 | 217 |
| 0.01 | 0.2 | 198 | 225 |

It can be understood from the above results that the strength of a silicon nitride sintered body can be recovered by the heat treatment according to the present invention, even when the sintered body is a considerably roughly processed one.

Example 5 (heat treatment atmosphere)

The single pass ground and untreated materials specified in Table 5 of Example 3 were heat treated under the following conditions. The materials were kept at respective temperatures for 4 hours.

TABLE 7

| Temp. (°C.) | Atmosphere | Strength (kg/mm$^2$) |
|---|---|---|
| 950 | atmospheric air | 180 |
| 950 | nitrogen | 208 |
| 950 | vacuum (10$^{-3}$ torr) | 205 |
| 950 | argon | 200 |
| 950* | hydrogen | 102 |

*Comparative Example

It can be understood from the above results the strength characteristics can be improved by the heat treatment in any atmosphere except hydrogen. In particular, it can be understood that the heat treatment in an oxygen-free atmosphere, i.e., an atmosphere other than atmospheric air can enhance the strength remarkably.

Example 6 (Heat Treatment in Nitrogen Stream)

Figure 5:
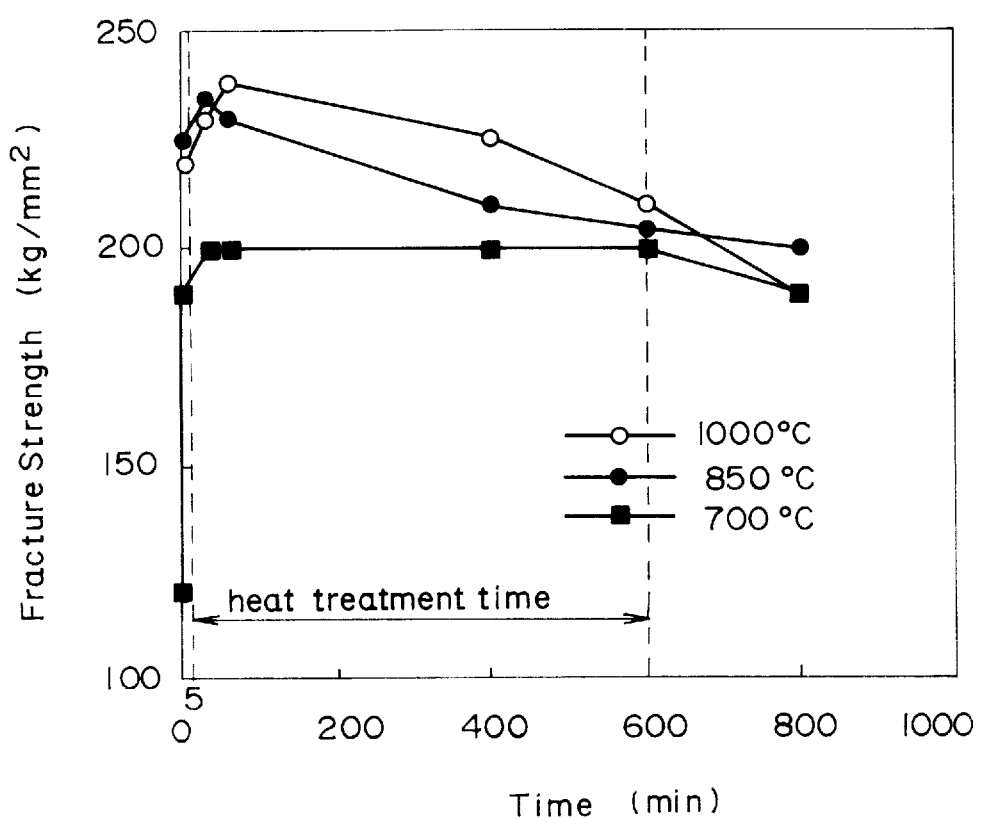
FIG. 5 is a graph showing the dependence of fracture strength on treatment temperature or treatment time in the heat treatment of the stock in a nitrogen stream.

The untreated material in Table 5 was heat-treated in a nitrogen stream at various temperatures for various times and the resultant heat-treated samples were measured for fracture strength. The results are given in FIG. 5. It can be understood from the results that it is preferable to conduct the heat treatment at a temperature ranging from the temperature (Tp) of peak internal friction minus 150° C. to that plus 150° C., (i.e., within a temperature range of Tp±150° C.) for 15 to 600 minutes.

Example 7 (Fatigue Characteristics Under Pulsating Load)

The material listed in Table 5 of Example 3 which had been single pass ground and heat-treated at 950° C. was examined for fatigue characteristics under pulsating load at room temperature and 800° C. The results are given in FIG. 6. In FIG. 6, lines (a), (b) and (c) show the fatigue under pulsating load at 800° C., the fatigue under pulsating load at room temperature and the fatigue of an un-heat-treated sample under pulsating load at room temperature, respectively. It can be understood that the silicon nitride sintered body of this Example is excellent in fatigue characteristics.

According to the present invention, a sintered silicon nitride material excellent in static strength can be, of course, provided. In particular, a material having extremely excellent characteristics can be provided when a sintered silicon nitride material is processed and thereafter subjected to the heat treatment according to the present invention. This material is extremely useful as parts required to have high performances such as valve train parts etc.

What is claimed is:

1. A process for the production of a silicone nitride sintered body, characteristic in that the silicon nitride sintered body stock is heat-treated wherein the heat treatment is conducted by keeping the stock within the temperature range for 5 to 600 minutes within a temperature range of from the temperature at which the internal friction of the stock exhibits a peculiar peak maximum minus 150° C. to that plus 150° C.

2. A process for the production of a silicon nitride sintered body as set forth in claim 1, in which said silicon nitride sintered body stock is produced by a process comprising:

(1) mixing powdered silicon nitride with powdery sintering aids to give a powder mixture, (2) molding the powder mixture to give a compact, (3) sintering the resulting compact in a nitrogen-containing atmosphere to give a sintered body, and (4) processing the sintered body into predetermined sizes to give a silicon nitride sintered body stock.

* * * * *